(12) United States Patent
Merceron et al.

(10) Patent No.: US 6,819,535 B2
(45) Date of Patent: Nov. 16, 2004

(54) DEVICE FOR PROTECTING LOADS SUPPLIED BY AN ALTERNATOR

(75) Inventors: Philippe Merceron, Vernous/Brenne (FR); Choukri Karoui, La Riche (FR)

(73) Assignee: STMicroelectronics S.A., Montrouge (FR)

( * ) Notice: Subject to any disclaimer, the term of this patent is extended or adjusted under 35 U.S.C. 154(b) by 26 days.

(21) Appl. No.: 10/293,197

(22) Filed: Nov. 13, 2002

(65) Prior Publication Data

US 2003/0090919 A1 May 15, 2003

(30) Foreign Application Priority Data

Nov. 13, 2001 (FR) .............................. 01 14657

(51) Int. Cl.$^7$ .............................. H02H 7/00; H02H 9/00
(52) U.S. Cl. .............................. 361/18; 307/66; 307/64
(58) Field of Search .......................... 363/145, 40, 45, 363/58, 60, 41, 17, 18; 323/282, 283, 275, 351, 279; 361/18, 56; 307/66, 64

(56) References Cited

U.S. PATENT DOCUMENTS

| | | | | |
|---|---|---|---|---|
| 5,105,324 A | * | 4/1992 | Murari et al. | 361/18 |
| 5,367,424 A | * | 11/1994 | Even | 361/18 |
| 5,589,762 A | * | 12/1996 | Iannuzo | 323/351 |
| 6,151,222 A | * | 11/2000 | Barrett | 363/16 |

FOREIGN PATENT DOCUMENTS

| | | |
|---|---|---|
| DE | 2130060 A | 6/1971 |
| GB | 2085246 A | 4/1982 |

* cited by examiner

Primary Examiner—Rajnikant B. Patel
(74) Attorney, Agent, or Firm—Lisa K. Jorgenson; William R. McClellan; Wolf, Greenfield & Sacks, P.C.

(57) ABSTRACT

A device of protection of at least one circuit supplied by a voltage obtained from at least one inductive element, including a switch for short-circuiting the supply provided by the inductive element, and circuitry for turning on the switch when the supply voltage exceeds a predetermined threshold and for turning it off when it is smaller than the threshold.

20 Claims, 2 Drawing Sheets

DEVICE FOR PROTECTING LOADS SUPPLIED BY AN ALTERNATOR

BACKGROUND OF THE INVENTION

1. Field of the Invention

The present invention generally relates to the protection of loads supplied by inductive circuits and, more specifically, by an alternator. The present invention more specifically relates to the automobile field and to the protection of the electric equipment of a vehicle. Such equipment is most often supplied by a battery and an alternator. The battery is used to supply the different electric devices when the vehicle is stopped, that is, when the alternator is not in operation. Conversely, when the vehicle motor runs, the circuits are directly supplied by the alternator, at the same time as the battery recharges.

2. Discussion of the Related Art

FIG. 1 very schematically shows, in the form of blocks, the electric circuit of a motor vehicle or of any other like system supplied by an alternator. An alternator 1 (ALT) has its output terminals 2 and 3 connected across a battery 4, one of the terminals (for example, 3) forming the most negative terminal or ground. Voltage Va across terminals 2, 3 of the battery and of the alternator supplies different electric pieces of equipment 5 (APPL1, APPL2, APPL3, ..., APPLN) of the concerned vehicle.

A risk inherent to the operation of an alternator and to the powering by said alternator of downstream electric circuits is linked to the incidental opening of the inductive circuit when the alternator operates. For example, in the application to motor vehicles, jolts when the vehicle is running are likely to disconnect, even temporarily, a terminal of one of the inductive elements. Such a disconnection opens the magnetic circuit, which results in an overvoltage in Ldi/dt for a relatively long time (generally several hundreds of ms for the case of a motor vehicle). Such a so-called "load-dump" overvoltage reaches values on the order 100 peak volts, which are sufficient to damage the electric circuits downstream of the alternator.

FIG. 2 shows in more detail a conventional example of a self-protected alternator 1 and of devices of protection of circuits 5 against overvoltages.

The alternator may be symbolized by an inductive circuit formed of three inductances L1, L2, and L3 arranged in a Y. The terminals corresponding to the free ends of inductances L1, L2, L3 as well as the terminal corresponding to the midpoint of the Y arrangement are individually connected to the anode of a zener diode DZ1, DZ2, DZ3, and DZ4, respectively. The cathodes of zener diodes DZ1 to DZ4 are interconnected and define positive terminal 2 of the electric circuit of the vehicle (connected to the positive terminal of battery 4). The anodes of diodes DZ1 to DZ4 are also respectively connected to the cathodes of zener diodes DZ5, DZ6, DZ7, and DZ8, having their anodes connected to ground 3. The function of diodes DZ1 to DZ8 is to clip the output voltage of the alternator. Diodes DZ1 to DZ8 are most often zener diodes of several tens of volts (more specifically, on the order of 40 volts). The choice of this value of several tens of volts is linked to automobile construction codes, which require that the battery voltage be able to reach 24 volts. Accordingly, the self-protected alternator must enable supply of the battery by means of a voltage at least equal to 24 volts.

A self-protected alternator 1 such as illustrated in FIG. 2 has the disadvantage of still letting through a 40-volt overvoltage for a relatively long time (several hundreds of ms).

The supply circuits of elements 5 almost systematically include a rectifying diode D1, D2, ..., DN having its anode connected to terminal 2 and its cathode connected to a first electrode of a capacitor C1, C2, ..., CN of local storage of the voltage at the level of the concerned circuit. The other electrode of capacitor $C_i$ is grounded. The different circuits 5 draw their supply from the power present at the level of capacitor $C_i$ and are, if necessary, provided with voltage regulators (linear or switched-mode regulators) to supply their internal circuits.

In the past, equipment 5 used to be provided with input regulators formed of passive (resistive) circuits, that could be oversized to withstand such voltages. With the increase of electronic circuits equipping motor vehicles, application circuits 5 are much more sensitive. It is thus necessary to protect the different circuits 5 to prevent them from seeing lasting overvoltages (several hundreds of ms) greater than 12 volts.

For this purpose, a zener diode DZA1, DZA2, ..., DZAN is conventionally provided at the input of each circuit 5. More specifically and as illustrated in FIG. 2, each zener diode $DZA_i$ (i ranging between 1 and N) has its cathode connected to positive terminal 2 of each capacitor $C_i$ and its anode connected to ground 3.

Such protection circuits are efficient. They however have several disadvantages.

A first disadvantage is that, because of the strong power that it is necessary to dissipate in case of an overvoltage due to a load-dump type overload, it is generally necessary to place several zener diodes in parallel to form each element $DZA_i$. Such a solution takes up space.

Another disadvantage is that such protection devices associated with the different application circuits are not integrable.

SUMMARY OF THE INVENTION

The present invention aims at providing a novel device of protection of electric circuits supplied by an alternator or the like which overcomes the disadvantages of conventional protection circuits.

The present invention more specifically aims at providing an integrable device of protection against overloads linked to an opening of an inductive supply circuit.

The present invention also aims at providing a solution which is compatible with the supply of an automobile battery by a voltage of several tens of volts, and which is compatible with the self-protection circuits of conventional alternators.

To achieve these and other objects, the present invention provides short-circuiting the supply terminals in case an overvoltage occurs.

A problem which is posed is that some pieces of equipment (application circuits) are then no longer supplied. Indeed, the input capacitors $C_i$ of the different application circuits are generally of small value and do not form sufficient reservoirs for a disappearing of the supply for several hundreds of milliseconds. Now, overloads of dump-load type may occur when the vehicle is running. It is thus particularly dangerous to take the risk of a supply failure of some of these equipments (for example, the steering assistance or the braking booster, etc.).

The UK patent application 2 085 246 discloses an overvoltage protection device wherein a thyristor is used to short the supply voltage when this voltage is above a predetermined threshold. Then, the thyristor is open again after a predetermined time by means of a multivibrator. A drawback of such a solution is that it does not make certain that the load elements are supplied when the protection becomes active. The predetermined time can cause a lack of supply of some load elements and the use of a thyristor can cause a further delay before a retriggering if the input a.c. voltage becomes too low at the end of the predetermined time.

The present invention thus more specifically aims at providing a solution which enables maintaining the supply of downstream-connected devices, even in the presence of an overload due to an opening of inductive circuits of load-dump type, while protecting the downstream devices.

More specifically, the present invention provides a device of protection of at least one circuit supplied by a voltage obtained from at least one inductive element, including a switch for short-circuiting the supply provided by the inductive element; and means for turning on the switch when said supply voltage exceeds a predetermined threshold and for turning it off when it is smaller than said threshold.

According to an embodiment of the present invention, the control means are formed of a comparator, a first input of which receives a reference voltage which is a function of said predetermined threshold, and a second input of which receives a voltage representative of the supply voltage provided by the inductive element.

According to an embodiment of the present invention, the device includes an element for damping the variations of the supply voltage at the comparator input.

According to an embodiment of the present invention, the comparator is supplied, from the supply voltage, by means of a capacitor constitutive of said damping element.

According to an embodiment of the present invention, the reference voltage is provided by a zener diode having its anode connected to ground and having its cathode connected to the first non-inverting input of the comparator.

According to an embodiment of the present invention, the second input of the comparator is connected to the midpoint of a voltage-dividing bridge receiving a voltage representative of the supply voltage.

The foregoing objects, features and advantages of the present invention will be discussed in detail in the following non-limiting description of specific embodiments in connection with the accompanying drawings.

DETAILED DESCRIPTION

Figure 1:
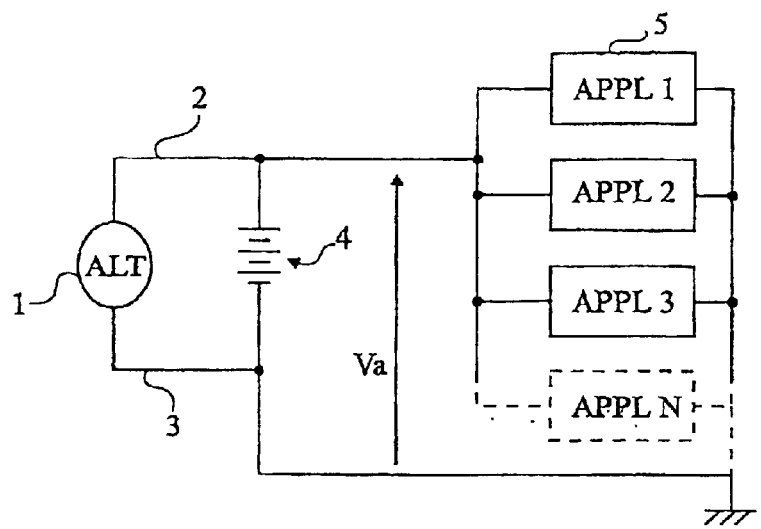
FIGS. 1 and 2, previously described, are intended to show the state of the art and the problem to solve.

The same elements have been referred to with the same reference numbers in the different drawings. For clarity, only those elements constitutive of the protection device of the present invention and of the system of electric equipment supply by means of an alternator which are necessary to the understanding of the present invention have been shown in the drawings and will be described hereafter. In particular, the different circuits and equipment supplied by the alternator have not been detailed.

Figure 3:
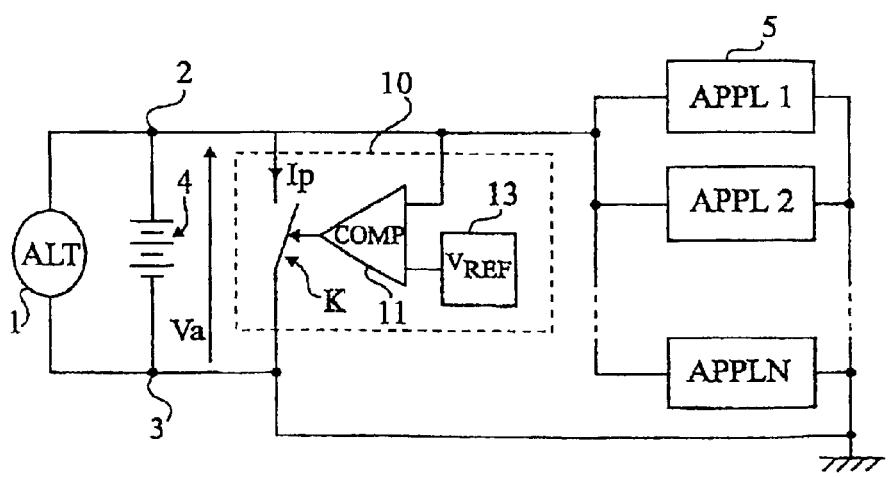
FIG. 3 very schematically shows in the form of blocks an embodiment of a protection device according to the present invention, applied to the protection of devices supplied by an alternator.

FIG. 3 shows an embodiment of a protection device 10 according to the present invention. In the example of FIG. 3, device 10 is applied to a self-protected alternator 1 (ALT) having two output terminals 2 and 3 connected to the positive and negative terminals of a battery 4, in charge of supplying circuits 5 when the alternator is not operating. The representation of FIG. 3 is similar to that of FIG. 1, in that voltage Va across terminals 2 and 3 of alternator 1 is used to supply electric equipments 5 forming downstream application circuits APPL1, APPL2, ..., APPLN using the electric power provided by alternator 1.

According to the present invention, protection device 10 includes a switch K intended to short-circuit terminals 2 and 3 of the electric supply. Switch K is controlled by a comparator 11 (COMP) of voltage Va with a reference voltage Vref. Accordingly, a first input of comparator 11 is connected to terminal 2 while a second input of this comparator receives a reference voltage Vref (block 13).

The function of comparator 11 is not to allow a permanent short-circuit of supply terminals 2 and 3, but to cause the turning back off of switch K as soon as voltage Va falls under the threshold set by voltage Vref.

Thus, according to the present invention, as soon as comparator 11 detects an overvoltage across supply terminals 2 and 3, it turns on switch K to have this voltage disappear. Since electric circuits 5 connected downstream keep on operating, they consume power, which results in decreasing voltage Va. As soon as this voltage falls under threshold voltage Vref, switch K turns off, which enable using again the power provided by the alternator. In the case where the overload is still present, which especially occurs for a load-dump overload which lasts for several hundreds of milliseconds, switch K periodically turns back on. The overvoltage thus is, in a way, chopped.

Figure 4A:
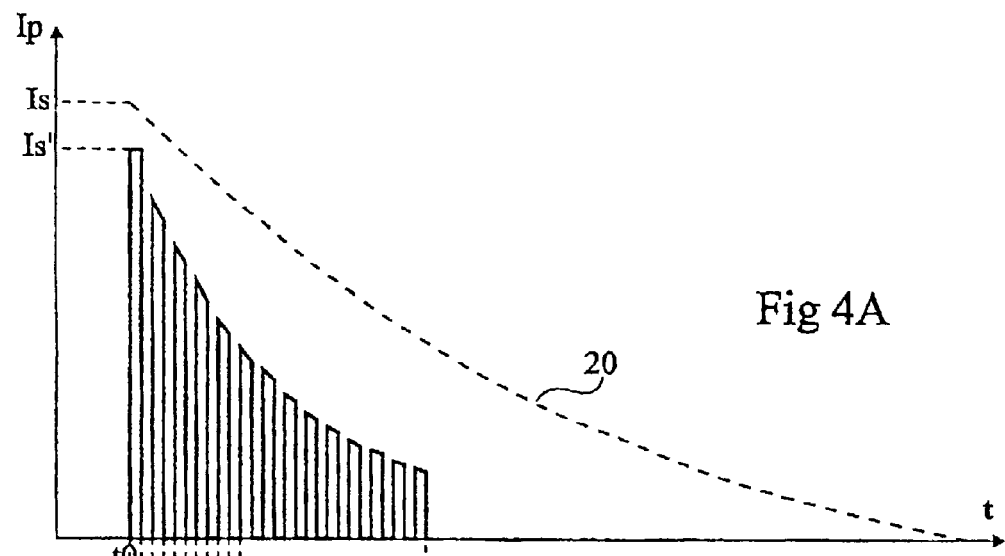
FIGS. 4A and 4B illustrate in the form of current and voltage timing diagrams the operation of the protection device according to the present invention.
Figure 4B:
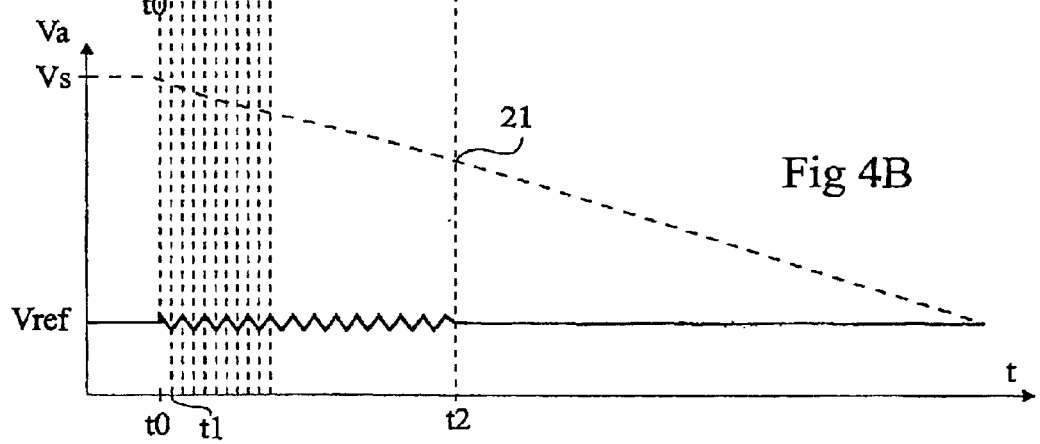

This operation is illustrated in FIGS. 4A and 4B which illustrate, along time, the operation of the device during a load-dump operation. FIG. 4A shows an example of shape of current Ip in switch K while FIG. 4B shows voltage Va across terminals 2 and 3 of the supply circuit. It is assumed that at a time t0, an overload of load-dump type, that is, a disconnection of one of its terminals when in operation, appears at the alternator level. Without protection device 10, this overload would cause an overvoltage of supply voltage Va until reaching a level Vs corresponding to the threshold voltage of the self-protection zener diodes of the alternator (DZ1 to DZ8, FIG. 2) which are, according to the present invention, always present. Further, a current of several tens of amperes Is would flow through the active zener diodes to protect the application circuits (DZAi, FIG. 2). The damping of this overvoltage over a duration of several hundreds of ms is illustrated with dotted lines 20 and 21 in FIGS. 4A and 4B.

With a device according to the present invention, the overload present at time t0 turns switch K on. This results in a significant current Ip flowing through switch K. The value of current Ip has been arbitrarily symbolized at a value Is' smaller than level Is. This has however no incidence upon the operation of the present invention.

As for voltage Va, it has a tendency to rise above level Vref at time t0. The turning-on of switch K decreases voltage Va again until it falls under threshold Vref. At this time (t1), switch K turns off, current Ip cancels and voltage Va rises back, which is the overload associated with the load-dump. This results in a new turning on of switch K, and so on. In FIG. 4B, the variations of voltage Va around level Vref have been exaggerated to show the small oscillations undergone by this voltage around the reference level.

Along time, the overload is essentially consumed by the electric circuits instead of being, as in the conventional case, essentially dissipated by diodes. As a result, at a time t2 far before the time of the end of the presence of the load-dump overload in the conventional case, current Ip in switch K becomes steadily zero, the entire overload having been consumed.

Figure 5:
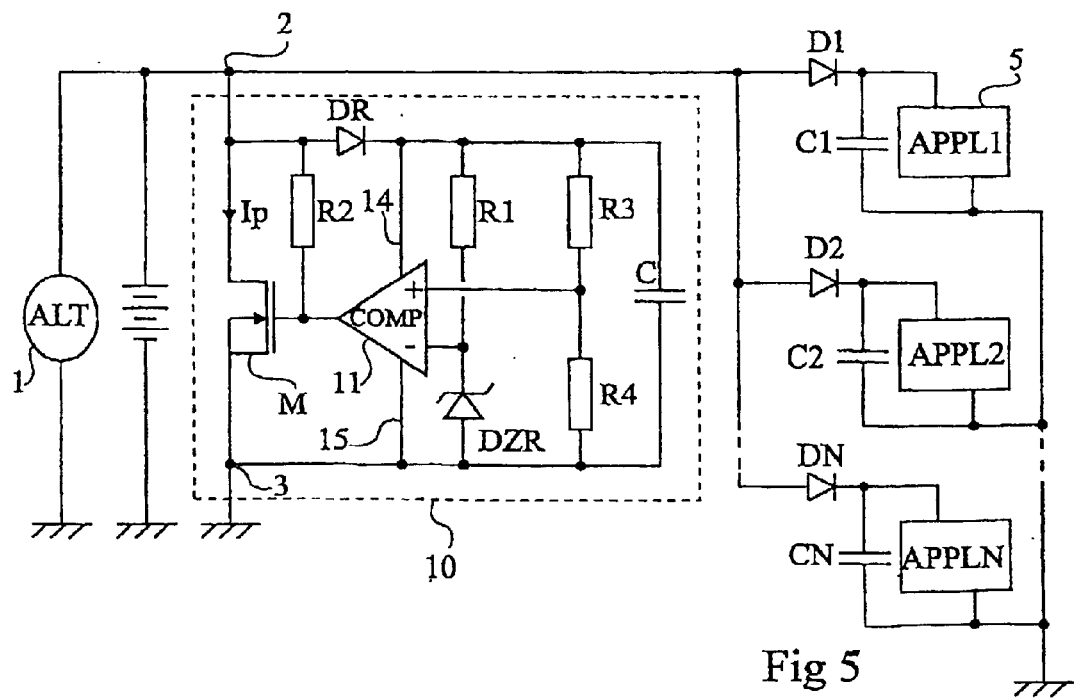
FIG. 5 shows a more detailed embodiment of the circuit of FIG. 3 in the same application.

FIG. 5 shows a more detailed embodiment of protection device 10 according to the present invention. FIG. 5 shows alternator 1 which is a self-protected alternator identical to the conventional alternator shown in FIG. 2 (that is, equipped with diodes DZ1 and DZ8).

Figure 2:
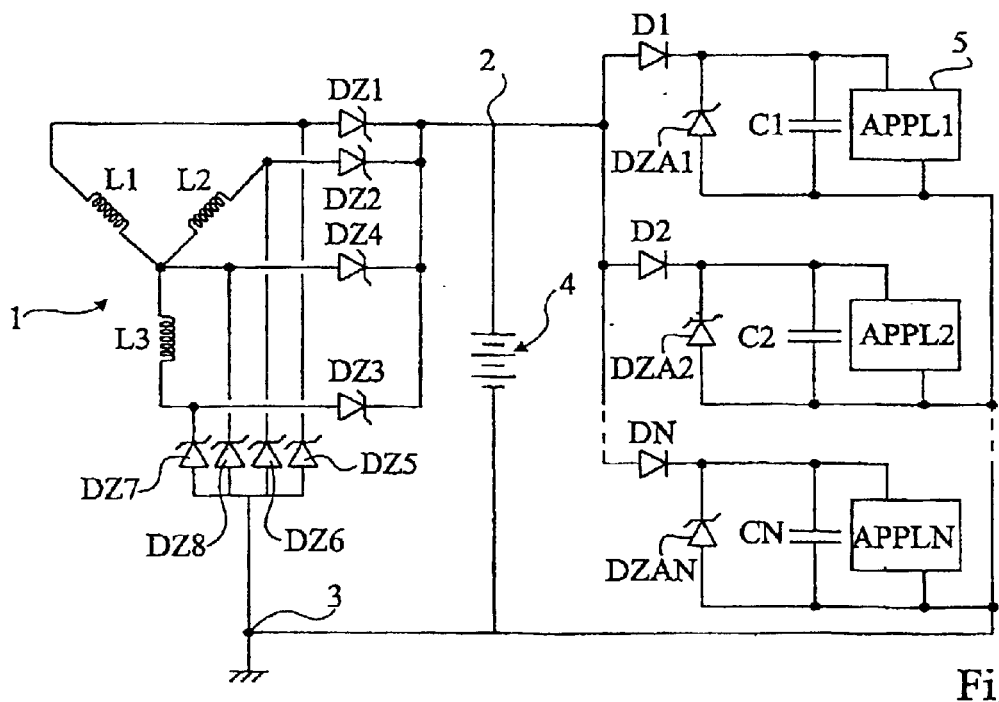

Each of circuits 5 is, conventionally, associated with a rectifying diode Di (i ranging between 1 and N) and with a capacitor Ci (i ranging between 1 and N), as is also shown in FIG. 2. However, according to the present invention, conventional zener diodes DZA1 to DZAN are no longer necessary. The function played by these diodes is advantageously replaced by device 10 of the present invention.

In the example of FIG. 5, switch K is formed of a MOS transistor, for example, with an N channel, M connected between terminals 2 and 3. The gate of transistor M is connected at the output of comparator 11. Such a comparator is for example made in the form of a differential amplifier (or operational amplifier) having an inverting input connected to the cathode of a zener diode DZR having its anode connected to ground 3. The function of diode DZR is to set reference voltage Vref. The comparator is supplied from the voltage between terminals 2 and 3, by means of a capacitor C (if necessary, in parallel with a resistor, not shown). For protection, a rectifying diode DR connecting terminal 2 to positive supply terminal 14 of comparator 11 connected to a first electrode of capacitor C is however provided, the anode of diode DR being connected to terminal 2. Negative supply terminal or ground terminal 15 of comparator 11 is directly connected to terminal 3, like the other electrode of capacitor C.

Diode DZR is directly biased by means of a resistor R1 connecting its cathode to the cathode of diode DR. In the example of FIG. 5, comparator 11 requires use of a so-called pull-up resistor R2 connecting its output to terminal 2 to set the high output state of comparator 11, turning on transistor M. The non-inverting input of comparator 11 is connected to midpoint 12 of a resistive dividing bridge formed of resistor R3 and R4 across which is applied voltage Va (neglecting the voltage drop in diode DR interposed between terminal 2 and resistor R3).

The sizing of the different components forming protection device 10 is a function of the application. In the example of an alternator for a motor vehicle, a 12-volt zener diode DZR and a dividing bridge R3, R4 performing a division by two of voltage Va may be provided. The voltage drop in diode DR is here neglected.

MOS transistor M is chosen to be able to conduct a current of several tens of amperes in the on state and, preferably, to have a low on-state series resistance (RdsON), to minimize or reduce the dissipation.

In the example of application to the automobile circuit where voltage Vs of the overloads does not exceed one hundred volts, the breakdown voltage of switch K in the form of a MOS transistor is generally not a problem.

In the example of FIG. 5, the case of a device 10 using an N-channel MOS transistor has been illustrated. However, this protection device may also be formed with a P-channel MOS transistor, or even a bipolar transistor which will then have the slight disadvantage of generating a stronger dissipation. The functional characteristic to be respected by switch K is to be controllable to be turned off and turned on, and any circuit of switch type performing this function may be used as an alternative. The use of an N-channel MOS transistor however is a preferred embodiment, due to its low cost and the fact that it is off in the idle state (in the absence of a gate voltage greater than its source voltage corresponding to ground 3). This enables guaranteeing that switch K is off when comparator 11 is not sufficiently supplied.

It should be noted that capacitor C also forms, with resistive bridge R3-R4, an RC cell setting a time constant to stabilize the protection device and avoid too fast oscillations. For example, and according to a specific embodiment, a time constant between 0.1 and 1 ms, which is suited to an application to motor vehicles, may be chosen.

In a specific example of implementation, the component forming device 10 will be chosen with the following values:
R1, R2=1 k$\Omega$;
R3, R4=2 k$\Omega$;
C=100 nf; and
Vref=12 volts.

An advantage of the present invention is that protection device 10 is integrable and avoids use of protection zener diodes at the input of the supplied electric devices.

Another advantage of the present invention is that protection device 10 is compatible with a maintaining of the operation of the supplied equipment in case of the presence of an overload of load-dump type.

Another advantage of the present invention is that the overvoltage power is used to supply the downstream circuits.

Another advantage of the present invention is that a single integrated device replaces all the downstream zener protection diodes.

Of course, the present invention is likely to have various alterations, modifications, and improvements which will readily occur to those skilled in the art. In particular, although the present invention has been described in relation to an application to motor vehicle alternators, it more generally applies to the protection of any electric circuit supplied by an inductive system.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for protection of at least one circuit supplied by a voltage obtained from at least one inductive element, including:
   a switch for short-circuiting a supply voltage provided by the inductive element; and
   control means for turning on the switch when said supply voltage exceeds a predetermined voltage threshold and for turning it off when said supply voltage is smaller than said threshold.

2. The device of claim 1, wherein said control means includes a comparator, a first input of which receives a reference voltage which is a function of said predetermined threshold, and a second input of which receives a voltage representative of the supply voltage provided by the inductive element.

3. The device of claim 2, including an element for damping variations of the supply voltage at the comparator input.

4. The device of claim 3, wherein the comparator is supplied, from the supply voltage, by means of a capacitor constituting said damping element.

5. The device of claim 2, wherein the reference voltage is provided by a zener diode having its anode connected to ground and having its cathode connected to the first non-inverting input of the comparator.

6. The device of claim 2, wherein the second input of the comparator is connected to the midpoint of a voltage-dividing bridge receiving a voltage representative of the supply voltage.

7. The protection device of claim 1, formed as an integrated circuit.

8. A supply circuit with an alternator, including, between the output terminals of the alternator, the protection device of claim 1.

9. A protection circuit comprising:
a switch configured to short circuit a supply voltage; and
a control circuit configured to turn on the switch in response to the supply voltage exceeding a threshold and configured to turn off the switch in response to the supply voltage being less than the threshold.

10. A protection circuit as defined in claim 9, wherein the control circuit comprises a comparator having a first input which receives a reference voltage that represents the threshold and a second input which receives a voltage that represents the supply voltage.

11. A protection circuit as defined in claim 10, wherein the control circuit further comprises a zener diode having an anode connected to ground and having a cathode connected to the first input of the comparator.

12. A protection circuit as defined in claim 11, wherein the control circuit further comprises a resistive divider connected to the second input of the comparator.

13. A protection circuit as defined in claim 9, wherein the switch comprises an N-channel MOS transistor.

14. A protection circuit as defined in claim 9, configured for a protection of a circuit connected to a vehicle alternator having at least one inductive element.

15. A protection circuit as defined in claim 9, wherein the switch and the control circuit are integrated on a single substrate.

16. A supply circuit comprising:
an alternator, having at least one inductive element, for producing a supply voltage;
an electronically controllable switch configured to short circuit the supply voltage; and
a comparator having a first input connected to a reference voltage which represents a threshold, a second input connected to sense the supply voltage and an output connected to control the switch, wherein the comparator is configured to turn on the switch when the supply voltage exceeds the threshold and to turn off the switch when the supply voltage is less than the threshold.

17. A supply circuit as defined in claim 16, further comprising a zener diode having an anode connected to ground and having a cathode connected to the first input of the comparator.

18. A supply circuit as defined in claim 17, further comprising a resistive divider connected to the second input of the comparator.

19. A supply circuit as defined in claim 16, wherein the electronically controllable switch comprises an N-channel MOS transistor.

20. A supply circuit as defined in claim 16, wherein the electronically controllable switch and the comparator are integrated on a single substrate.

* * * * *